United States Patent Office 3,013,862
Patented Dec. 19, 1961

3,013,862
PURIFICATION OF TITANIUM DIBORIDE
Frank H. May, Whittier, Calif., assignor to American Potash & Chemical Corporation, a corporation of Delaware
No Drawing. Filed July 21, 1960, Ser. No. 44,260
2 Claims. (Cl. 23—204)

This invention relates to a process for the purification of titanium diboride and more particularly to a process for the removal of contaminants present in this material such as free carbon, oxides and carbides.

Titanium boride is commonly produced by a carbothermic method of manufacture in which a mixture of titanium oxide, boric oxide and carbon is heated to an elevated temperature. The materials react, as is well known, to form titanium boride and carbon monoxide. While various claims have been made for the production of a high quality material by this carbon reduction method, we have found that on a practical scale of production, the best average product we could produce analyzed, for example, about 96% titanium diboride and from 1% to 3% carbon. In producing this material twenty-five separate runs were made using an induction furnace in which the charge was very carefully made up of high purity analyzed raw materials and maintained at an atmosphere of pure argon throughout the reaction and cooling cycle. The carbon monoxide evolved was carefully measured to ensure complete reaction and to avoid the presence of unreactive raw material in the product. This material was appreciably better in quality than the 91–94% titanium boride now available commercially. However, it was considerably below the desired 99% purity.

It is possible to obtain a crude product which is low in carbon if one starts with a mixture of the mixed oxides containing a deficiency of carbon for the balanced reaction. The product in this case, however, while low in carbon, always contains an appreciably higher oxide content and is generally very low in boron content, the boron titanium mole ratio being on the order of 1.85–1.90 due to volatile boron losses. This product is more difficult to upgrade to the correct ratio and high purity than is a high carbon-low oxide crude material. This is because the volatility of boric oxide makes it difficult to obtain an exact adjustment of the boron and carbon values in the upgrading reaction.

The most common impurity besides carbon or carbides found in carbothermic produced titanium borides is oxygen or oxides. The residual 1–3% oxygen always present in the directly produced material appears to be present as oxides in solid solution or in some combined form with the boride. Reheating the crude product to the original reaction temperature (1700–1900° C.) with excess carbon does not remove this residual oxygen and only serves to degrade the product.

I have discovered that this residual oxygen can be effectively removed by reacting the crude titanium boride with a small amount of titanium in combination with that amount of carbon and metal oxide necessary to generate and evolve carbon monoxide and produce the metal boride. Thus, the oxygen is balanced against the contained carbon plus additional amounts, if required, and the titanium is balanced to the boride ratio with the boron oxide as required for the overall stoichiometry. These principles are illustrated by the following specific equations for $TiB_2$:

(1)   $TiO_2 + B_2O_3 + 5C \rightarrow TiB_2 + 5CO$ (2)   $Ti + B_2O_3 + 3C \rightarrow TiB_2 + 3CO$ (3)   $O_2 + 2C \rightarrow 2CO$ From an over-all standpoint, the complete reaction and removal of both carbon and oxygen are based upon the relationship as shown in reaction 3. In the same way, formation of $TiB_2$ is based upon the proper balance of titanium and boron. The only exception to an absolute balance is that an excess of $B_2O_3$ can be tolerated due to the volatility of this compound. Elemental titanium is required to release the oxygen in the crude $TiB_2$. For economical reasons, only the necessary minimum effective amounts of elemental titanium should be used; 1% based upon weight of crude is generally effective. Boric oxide, along with the necessary carbon in accordance with reaction 2, is required along with the elemental titanium to maintain the $TiB_2$ ratio. Carbon is also required to react with the oxygen released from the crude $TiB_2$. The carbon in the crude material (including carbon pickup from the crucible) may be adequate for both of these requirements in which case the upgrading would be covered by reactions 2 and 3. On the other hand, if the crude contains an excessive amount of carbon contamination, this excess carbon would be removed by reacting with a mixture of $TiO_2$ and $B_2O_3$ in accordance with reaction 1.

Then, reaction 1 takes care of excess carbon over and above that required by reactions 2 and 3. Reaction 2 takes care of the titanium addition and reaction 3 takes care of the oxygen in the crude $TiB_2$. For effective upgrading, an excess of $B_2O_3$ is used to allow for losses of this volatile oxide. Titanium and carbon must be well balanced in accordance with reactions 1, 2 and 3 however, neglecting excess $B_2O_3$ and allowing for carbon pick-up from the crucible.

Small amounts of all three ingredients, $TiO_2$, $B_2O_3$ and C, in accordance with reaction 1 may be added to give a more homogeneous mixture and resultant reaction in the upgrading step. These materials in correct balance do not enter into the upgrading reaction other than to ensure better over-all reaction and produce a small amount of $TiB_2$.

The small quantity of titanium metal present reacts with the main body of the boride product when the mixture is heated to above about 1600° C., but below the melting point of $TiB_2$, about 2700° C. The preferred range is between about 1600° C. to about 1750° C. Reaction is evidenced by the complete disappearance of the elemental material. It is theorized that the reaction causes extensive recrystallization of the boride thus releasing the occluded or combined oxygen to react with any carbon or carbides present. Whatever the reaction, the oxygen is effectively removed as shown by the following examples. The oxygen content in each instance includes about 0.05–0.10% of iron and other impurities.

*Example 1*

A 2517 gram sample having the following analysis:

|  | Wt. percent |
|---|---|
| Titanium | 66.3 |
| Boron | 28.9 |
| Carbon | 3.30 |
| Oxygen | 1.60 | was mixed with the following materials:

|  | Grams |
|---|---|
| Titanium metal | 25.2 |
| $B_2O_3$ | 241.2 |
| $TiO_2$ | 48.2 |
| Carbon | 20.1 |

The mixture was well blended and then heated for about 100 minutes at 1600–1750° C. in an induction furnace. The heating was conducted in a carbon crucible under an argon atmosphere. The 2676 grams of reacted product was a free flowing, grey crystalline powder. This direct product was analyzed with the following results:

| | Wt. percent |
|---|---|
| Titanium | 68.8 |
| Boron | 30.6 |
| Carbon | 0.20 |
| Oxygen | 0.40 |

*Example II*

Following the procedure used in Example I, a 2625 gram sample with the following analyses:

| | |
|---|---|
| Titanium metal | 67.0 |
| Boron | 28.7 |
| Carbon | 2.47 |
| Oxygen | 1.83 | was mixed with the following materials:

| | Grams |
|---|---|
| Titanium metal | 26 |
| Boric oxide | 156 |

This mixture, contained in a carbon crucible, was then placed in the induction furnace and heated to about 1600–1750° C. for a period of approximately 100 minutes. The free flowing, highly crystalline product was then analyzed with the following results:

| | |
|---|---|
| Titanium | 68.6 |
| Boron | 30.4 |
| Carbon | 0.09 |
| Oxygen | 0.91 |

The upgrading treatment is highly dependent upon an accurate analysis of the material to be upgraded. An insufficient amount, too great an excess, or an incorrect ratio of upgrading reactants will fail to upgrade the product and may even lower the purity. However, once the crude product has been reacted with elemental titanium, the product can be completely upgraded to 99% purity in subsequent steps with the proper combination of the metal oxide, boric oxide and carbon without further addition of elemental metal.

To remove carbon, it is important that the correct ratio of the reactants be present. If the metal oxide alone is used the following typical reaction is most likely to take place with only part or very little removal of carbon. There is always the possibility of some pick-up of carbon from the carbon container.

(4) $\quad TiO_2 + 3C \rightarrow TiC + 2CO$

Boric oxide when used alone reacts in a similar manner to form $B_4C$ but the reaction is considerably less efficient because much of the boric oxide may be lost by volatilization at 1700–1800° C. reaction temperature. When a mixture of metal oxide and boric oxide is used, however, the reaction with carbon (or carbides) proceeds with high efficiency. Two separate experiments (Examples III and IV) which effectively demonstrate these individual effects are presented below.

*Example III*

In this run, 576 grams of impure titanium diboride (previously treated with titanium metal to release the combined or dissolved oxygen) analyzing in carbon and oxygen as follows:

| | Wt. percent |
|---|---|
| Carbon | 0.74 |
| Oxygen | 2.81 | were mixed with 15 grams of $TiO_2$ and heated in the induction furnace for approximately 100 minutes at 1600–1750° C. in an argon atmosphere. The product from this treatment analyzed:

| | |
|---|---|
| Carbon | 0.58 |
| Oxygen | 2.22 | showing very little reduction in carbon and oxygen content and demonstrating the ineffectiveness of the metal oxide alone.

*Example IV*

In another run, 2676 grams of titanium diboride (previously treated with metal titanium as in Example III) analyzing:

| | |
|---|---|
| Carbon | 0.90 |
| Oxygen | 1.40 | was mixed with 48.2 grams of $TiO_2$ and 102 grams of $B_2O_3$ and the mixture was then heated to 1600–1750° C. in an argon atmosphere, for approximately 100 minutes. The product was then analyzed and found to contain:

| | |
|---|---|
| Carbon | 0.20 |
| Oxygen | 0.40 | showing an effective removal of both impurities.

I claim:

1. A process for purifying crude titanium diboride which is contaminated with oxygen and at least one carbonaceous material selected from the group consisting of free carbon and combined carbon, said process comprising mixing the crude titanium diboride with sufficient boric oxide, titanium and carbon to react with the oxygen and the carbonaceous material present in the crude titanium diboride in accordance with the following:

(1) $\quad TiO_2 + B_2O_3 + 5C \rightarrow TiB_2 + 5CO$ (2) $\quad Ti + B_2O_3 + 3C \rightarrow TiB_2 + 3CO$ (3) $\quad O_2 + 2C \rightarrow 2CO$ heating the mixture to a temperature of about 1600°–1750° C. in an inert atmosphere, and recovering the titanium boride substantially free of carbon and oxygen.

2. In a process for purifying crude titanium diboride which is contaminated with oxygen and at least one carbonaceous material selected from the group consisting of free carbon and combined carbon, the steps comprising heating in an inert atmosphere a mixture of the crude titanium diboride with about 1% of titanium metal, together with boric oxide to convert titanium metal to titanium diboride and equivalent carbon to convert oxygen values to carbon monoxide, continuing the heating until the temperature of the mixture is about 1600°–1750° C., and recovering the titanium boride substantially free of carbon and oxygen.

References Cited in the file of this patent

UNITED STATES PATENTS

| 2,906,605 | Dubeck | Sept. 29, 1959 |
| 2,913,312 | Dubeck | Nov. 17, 1959 |
| 2,973,247 | Espenschied | Feb. 28, 1961 |